United States Patent [19]

Laesser et al.

[11] 4,139,272
[45] Feb. 13, 1979

[54] ELECTRO-OPTIC PASSIVE DISPLAY DEVICE

[75] Inventors: Claude Laesser, La Chaux-de-Fonds; Rene Viennet; Fereydoun Gharadjedaghi, both of Neuchatel, all of Switzerland

[73] Assignee: Ebauches S.A., Switzerland

[21] Appl. No.: 796,516

[22] Filed: May 13, 1977

[30] Foreign Application Priority Data

May 20, 1976 reg. [CH] Switzerland............. 6638/76

[51] Int. Cl.² .................................................. G02F 1/13
[52] U.S. Cl. .................................... 350/337; 350/345; 350/347; 350/352
[58] Field of Search ................. 350/337, 345, 347, 352

[56] References Cited

U.S. PATENT DOCUMENTS

| | | | |
|---|---|---|---|
| 3,950,078 | 4/1976 | Zatsky | 350/345 |
| 4,017,156 | 4/1977 | Moriyama et al. | 350/347 |
| 4,019,808 | 4/1977 | Scheffer | 350/347 |
| 4,032,218 | 6/1977 | Scheffer | 350/337 |
| 4,043,636 | 8/1977 | Eberhardt et al. | 350/345 |

*Primary Examiner*—Edward S. Bauer
*Attorney, Agent, or Firm*—Silverman, Cass & Singer, Ltd.

[57] ABSTRACT

An electro-optic passive display device displays information in dark characters on a light background during the day, and in light characters on a dark background during the night. The device has a polarizer, an electro-optic display cell, a quarter-wave plate, a chloesteric liquid crystal cell and an illuminator arranged in superposition on each other. These elements control the polarization of light transmitted through the device which polarization causes the changing of the displayed information from dark characters on a light background to light characters on a dark background.

7 Claims, 3 Drawing Figures

ELECTRO-OPTIC PASSIVE DISPLAY DEVICE

BACKGROUND OF THE INVENTION

The present invention relates to an electro-optic passive display device.

It is known, in such devices, that for physiological reasons, the reading of a display is facilitated if the information is displayed, during the day, in dark characters on a light background, and, during the night, in light characters on a dark background.

In the nematic liquid crystal display devices having a field effect, such display conditions can be obtained while rotating an upper polarizer at an angle of 90° when one changes from the day reading to night reading. This solution has drawbacks due to the fact that it is difficult to reconcile the movement of the polarizer with the seal of the display device. Also, because polarizers are very sensitive to humidity, it is necessary to insulate or encapsulate them completely.

The purpose of the present invention is to furnish a solution to this problem.

SUMMARY OF THE INVENTION

To this effect, the electro-optic passive display device according to the invention is characterized by the fact that it comprises, in superposition, a lighting device, a cholesteric cell and a passive display cell. The maximum wave length of emission of the lighting device is included in the band of reflection of the cholesteric cell. The whole display device is arranged in such a way that the information is displayed, during the day, in dark characters on a light background and, during the night, in light characters on a dark background.

DESCRIPTION OF THE DRAWINGS

The drawings show two embodiments of the object of the invention.

DESCRIPTION OF THE INVENTION

Figure 1:
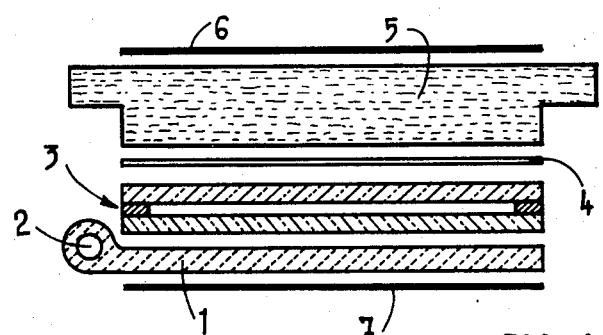
FIG. 1 is a sectional side view of a first embodiment of an electro-optic passive display device.

The display device represented in FIG. 1 comprises a lighting device comprising a transparent light guide 1 and a source 2 of monochromatic light located in the light guide 1. This display device comprises moreover a cholesteric liquid crystal cell 3, which acts as a diffuser, and is superimposed on the light guide 1. Superimposed on cell 3, with interposition of a quarter-wave plate 4, is a nematic liquid crystal passive display cell 5. A polarized 6 is situated in front of the cell 5 while a black shield 7 is situated behind the light guide 1.

The device as disclosed and represented operates as follows:

During the day, the light entering into the display cell 5 is polarized vertically by the polarizer 6, this latter being suitably oriented. In the areas where no electric field is applied to the liquid crystal cell 5, the molecules of this liquid crystal are oriented helically so that the plane of polarization of the light rotates 90°. Hence, in this case, the light passing through the liquid crystal is polarized horizontally. After having passed through the quarter-wave plate 4, the light is polarized circularly, the vector of rotation rotating to the left with the quarter-wave plate being suitably oriented. The cholesteric liquid crystal of the cell 3 and a property of reflecting circularly polarized light having the same sense of rotation as the cholesteric liquid crystal, for a band of wave lengths defined by its own characteristics. Hence, circularly polarized light having a rotation towards the left is partially reflected by the cholesteric liquid crystal. The reflected portion of light passes again through the quarter-wave plate 4 in a reverse sense, polarized linearly, in a horizontal plane. The light then passes through the nematic liquid crystal coating where the plane of polarization rotates 90°, being then polarized vertically, the light passes through the polarizer 6. The areas where no electric field is applied to the liquid crystal of the display cell 5 will thus appear to the user as being light, of the color corresponding to the band of wave length reflected by the cholesteric liquid crystal.

In the areas where an electric field is applied to the terminals of the nematic liquid crystal of the cell 5, the molecules of this crystal do not maintain their helical structure but move in the sense of the field and orient themselves perpendicularly to the plane of the cell. Consequently, the polarization of the light is not affected and the light leaves the liquid crystal being polarized vertically, the same as it entered therein. The quarter-wave plate 4 polarizes the light circularly but, this time, the plane of polarization rotates to the right, so that almost all of the light passes through the cholesteric liquid crystal. Hence the areas where an electric field is applied to the display cell 5 appear dark.

Consequently, during the day, the display appears in dark characters on a light background.

During the night, the monochromatic light issued from the source 2 is conducted by the light guide 1 which distributes it under the cholesteric cell 3. The light being isotropic, one can say that half of the light flux has a plane of polarization rotating to the right, and the other half rotating to the left. The light the plane of polarization of which rotates in the same sense as the cholesteric crystal of the cell 3 is reflected by this crystal while the light the plane of polarization of which rotates in the opposite sense can traverse the diffuser constituted by the cholesteric cell 3. The light which comes out from the cell 3 is consequently polarized circularly and after having passed through the quarter-wave plate 4, is polarized linearly, its plane of polarization being parallel to the plane of the polarizer 6.

In the areas where the cell 5 is not activated, the plane of polarization of the light rotates 90° and is then perpendicular to the plane of polarization of the polarizer 6 which absorbs this light in the said areas. In the activated areas of the display cell 5, the plane of polarization of the light does not rotate, so that there is a coincidence between the plane of polarization of the light and the plane of the polarizer 6 through which the light is then passed.

Thus, during the night, the display appears in light characters on a dark background.

Figure 2:
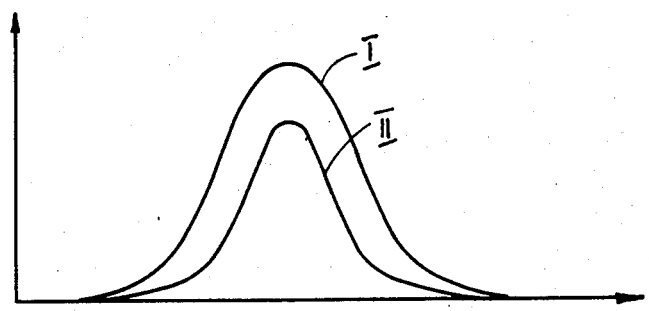
FIG. 2 is a diagram indicating the operation of the display device.

As shown by the FIG. 2, curve I is the curve of reflection of the cholesteric crystal, the wave lengths being indicated along the X - axis and the rate of reflection along the Y - axis. Curve II indicates the intensity of the light source, which is also indicated along the Y - axis. One sees that it is necessary that the band of the wave lengthes of the light source used be included in the band of reflection of the crystal. As a matter of fact, one may ascertain that the emitted light, the wave length of which is not included in the band of reflection of the cholesteric crystal passes through the said crystal, and is not polarised. This polarized light would uniformly light the entire display because it is not absorbed by the polarizer 6. The reading of displayed information would thus be so much more difficult that the shifting of the maxima of the curves I and II would be important.

Figure 3:
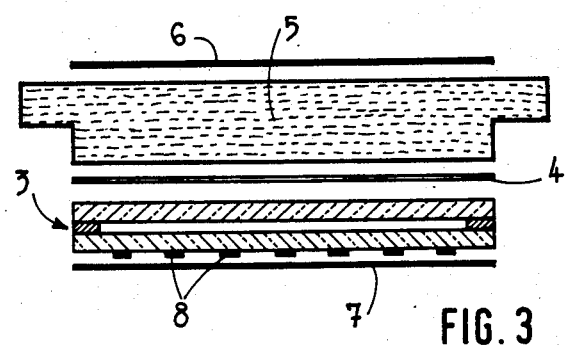
FIG. 3 is a sectional side view of a second embodiment of an electro-optic passive display device.

In the embodiment of FIG. 3, the light source is comprised of several light emitting diodes 8 placed on the rear plate of the cholesteric cell 3. These diodes 8 are disposed opposite the display segments of the cell 5, so that the lighting is direct and is concentrated in the areas to be read.

It results from this arrangement that the quantity of light which is necessary is substantially less than that which is necessary for the display device of FIG. 1.

For still reducing the consumption of energy, one could light only the diodes situated opposite the activated segments, that would have, however a drawback of rendering the control circuit more complicated.

What we claim is:

1. An electro-optic display device comprising, a polarizer for vertically polarizing light, an electro-optic display cell adjacent the polarizer for rotating the plane of polarization of light transmitted therethrough in the absence of an applied electric field and for transmitting light with its plane of polarization unchanged when an electric field is applied, a quarter-wave plate adjacent the side of said display cell opposite said polarizer for converting light from the cell to circularly polarized light of one handedness when an electric field is applied to said cell and for converting light from the cell to circularly polarized light of the opposite handedness when no electric field is applied to said cell, a cholesteric liquid crystal cell on the side of said quarter-wave plate opposite said electro-optic cell for reflecting circularly polarized light of one-handedness whose wave lengths are within its reflection band and for transmitting the remainder of the light, and an illuminator on the side of said cholesteric liquid crystal cell opposite said electro-optic cell and said quarter-wave plate and having an emission spectrum within the reflection band of said cholesteric liquid crystal so that, during bright ambient conditions, dark information is displayed against a bright background and, during dark ambient conditions, bright information is displayed against a dark background.

2. A device as claimed in claim 1 wherein the illuminator includes a monochromatic source of light.

3. A device as claimed in claim 1 further comprising a black shield arranged on a side of the illuminator opposite the cholesteric liquid crystal cell.

4. A device as claimed in claim 1 wherein the illuminator includes a light guide within which is located a source of light.

5. A device as claimed in claim 1 wherein the illuminator includes light emitting diodes.

6. A device as claimed in claim 5 wherein the light emitting diodes are mounted on the cholesteric liquid crystal cell.

7. A device as claimed in claim 5 wherein the light emitting diodes are distributed on the illuminator adjacent the display segments of the electro-optic display cell.

* * * * *

UNITED STATES PATENT AND TRADEMARK OFFICE
CERTIFICATE OF CORRECTION

PATENT NO. : 4,139,272
DATED : February 13, 1979
INVENTOR(S) : CLAUDE LAESSER et al It is certified that error appears in the above—identified patent and that said Letters Patent are hereby corrected as shown below:

On the Title page in the priority information block [30]

change "6638/76" to --6338/76--.

Signed and Sealed this

Fifth Day of June 1979

[SEAL]

Attest:

RUTH C. MASON
Attesting Officer

DONALD W. BANNER
Commissioner of Patents and Trademarks